United States Patent
Gersch et al.

(10) Patent No.: US 9,899,839 B2
(45) Date of Patent: Feb. 20, 2018

(54) POWER SYSTEM FOR PROVIDING A GRID SERVICE TO A POWER GRID

(71) Applicant: CATERVA GMBH, Pullach (DE)

(72) Inventors: Roland Gersch, Munich (DE); Markus Brehler, Baierbrunn (DE)

(73) Assignee: CATERVA GMBH, Pullach (DE)

( * ) Notice: Subject to any disclaimer, the term of this patent is extended or adjusted under 35 U.S.C. 154(b) by 218 days.

(21) Appl. No.: 14/786,019

(22) PCT Filed: Apr. 29, 2013

(86) PCT No.: PCT/EP2013/058893
§ 371 (c)(1),
(2) Date: Oct. 21, 2015

(87) PCT Pub. No.: WO2014/177175
PCT Pub. Date: Nov. 6, 2014

(65) Prior Publication Data
US 2016/0099568 A1     Apr. 7, 2016

(51) Int. Cl.
| H02J 1/10 | (2006.01) |
| H02J 3/06 | (2006.01) |
| H02J 3/46 | (2006.01) |
| H02J 3/28 | (2006.01) |
| H02J 3/32 | (2006.01) |
| H02J 3/38 | (2006.01) |

(52) U.S. Cl.
CPC ........ *H02J 3/28* (2013.01); *H02J 3/32* (2013.01); *H02J 3/381* (2013.01)

(58) Field of Classification Search
CPC .................. H02J 3/28; H02J 3/32; H02J 3/381
USPC ..................................................... 307/20, 48
See application file for complete search history.

(56) References Cited

U.S. PATENT DOCUMENTS

| 2010/0276998 A1 | 11/2010 | Luo et al. | |
| 2012/0068540 A1 | 3/2012 | Luo et al. | |
| 2014/0324243 A1* | 10/2014 | Markowz | H02J 7/34 700/297 |

FOREIGN PATENT DOCUMENTS

WO    2007/104167    9/2007

OTHER PUBLICATIONS

Search Report issued for PCT/EP2013/058893, dated Jan. 21, 2014.

* cited by examiner

*Primary Examiner* — Carlos Amaya
(74) *Attorney, Agent, or Firm* — Greenblum & Bernstein, P.L.C.

(57) ABSTRACT

A power system for providing a grid service to a power grid, said power system comprising: an energy resource controller (ERC) adapted to monitor a state of charge (SOC) of at least one energy storage device (ESD), wherein said energy resource controller (ERC) adjusts in a normal operation mode (NM) a power supplied by the energy storage device (ESD) to said power grid (PG) or a power received by the energy storage device (ESD) from said power grid (PG) in response to grid parameters or remotely generated control signals to stabilize said power grid (PG), wherein if the monitored state of charge (SOC) of said energy storage device (ESD) exceeds an upper state of charge limit (SOC-H) the energy resource controller (ERC) connects in a power absorption mode (PAM) a power absorbing load (PAL) to said power grid as long as the grid parameters or remotely generated control signals indicate that power is to be removed from said power grid (PG).

18 Claims, 4 Drawing Sheets

POWER SYSTEM FOR PROVIDING A GRID SERVICE TO A POWER GRID

FIELD OF DISCLOSURE

The invention relates to an apparatus and a method for providing a grid service to a power grid. A power grid or a power supply grid supplies consumers with electrical power. These consumers can be located in distributed buildings where electrical devices such as washing machines or refrigerators consume electrical power as loads. Homes or buildings can comprise an inhouse grid which is connected to a local distribution grid which in turn can be connected to a transmission grid of the power grid. In addition to the consuming entities consuming electrical power, the use of distributed power sources and energy storage devices increases significantly. Energy storage devices can be formed by electrical storage devices which are adapted to store electrical energy by storing electrical charges in a battery or accumulator. Energy storage devices can also be formed by charge storage devices such as capacitors or electrochemical storage devices such as accumulators or batteries. Moreover, energy storage devices can be formed by mechanical storage devices such as rotating masses. All energy storage devices outlined above can be implemented in a geographically distributed way.

BACKGROUND

The public power grid supplies alternating electrical currents to the consumers. The power grid must comply with predetermined requirements such as target frequencies of the alternating current distributed by the power grid. The frequency of the alternating current within the power grid can be different for different states or countries. For instance, in Germany the basic frequency of the voltage provided by the public power grid is 50 Hz, whereas in the USA it is 60 Hz. The equipment connected to the power grid is normally unable to operate under significant deviations from the target frequency. For example, transmission system operators in Europe contract equipment operators to commence stabilization measures as soon as the grid frequency of the power grid deviates by more than 0.01 Hz from the target frequency of 50 Hz. Accordingly, it is necessary to provide grid services to the power grid where stabilization measures are required. These stabilization measures either add power to the grid or remove power from the grid in order to stabilize the frequency of the power grid. In a conventional power system, this is achieved by adjusting the power output of power generation units operating below their maximum power output capability, or by deploying various forms of energy storage devices including pumped hydro power plants, accumulators/batteries or flywheels. Further, it has been proposed to control the heating of residential homes that consume power.

Electrical storage devices, such as capacitors, store energy by separation of electrical charges. Electrochemical storage devices, in particular batteries or accumulators, additionally store energy by separation of materials with different electrode potentials. Mechanical storage devices store energy by elevation of mass in a gravitational field, mechanical compression or, in the case of a spring, mechanical extension, or rotational energy (so called Flywheel). All energy storage device comprise a maximum storage capacity or a maximum state of charge $SOC_{max}$, either determined by the characteristics of the underlying process and the materials used therein, or determined by characteristics of the implementation, such as the type and quality of membranes in batteries. The current state of charge of an electrochemical storage device is the amount of energy which can be drawn from the battery and can be indicated as a percentage of the maximum state of charge of the respective battery. The maximum state of charge of any battery deteriorates with use, i.e. charging and discharging, of the battery. The end of life of a battery is thus frequently defined in terms of a minimal maximum state of charge, although this end-of-life condition can also be chosen in terms of other performance characteristics of the battery, such as the internal resistance. In general, charging a battery whose state of charge is close to the maximum state of charge will bring about more deterioration of the battery than the same charging at lower states of charge. Furthermore, the maximum power output of a battery at a state of charge which is close to the minimum state of charge is lower than the maximum power output at higher states of charge, and will at a certain state of charge be insufficient to satisfy the requirements of the application in which the battery is deployed. Similar rules govern all other forms of energy storage. Therefore, for any combination of an energy storage device and an application, a lower state of charge limit SOC-L and an upper state of charge limit SOC-H is defined. If the charge stored in the energy storage device exceeds the upper state of charge limit SOC-H of the respective energy storage device, the lifespan or possible operation time of the energy storage device is reduced to an commercially unacceptable extent. Further, if the charge drops beneath the lower state of charge limit SOC-L of the respective energy storage device, the storage device will not be able to satisfy the requirements of the application in which the storage device is deployed. Accordingly, an energy storage device should be operated in a state of charge range between the upper state of charge limit SOC-H and the lower state of charge limit SOC-L.

An energy storage device ESD is normally controlled by an energy resource controller ERC which can be connected via a communication device or communication interface and a communication link to a remote, central or distributed control unit of the power supply grid. If the state of charge of the energy storage device controlled by the energy resource controller exceeds the upper state of charge limit SOC-H the energy resource controller can send a signal to the control unit that excessive electrical energy is locally available and can be provided to other users or facilities connected to the power grid. The excessive electrical energy of the energy storage device can then be provided to other consumers or storage devices to reduce the state of charge of the respective energy storage device such that it falls beneath the upper state of charge limit SOC-H of the energy storage device. However, in such a conventional system, there can be a significant time delay until the exceeding electrical power in the energy storage device can be supplied to other consumers. Because of this time delay, it can happen that the state of charge SOC of the energy storage device still increases during the delay time and can exceed even the maximum state of charge $SOC_{max}$ of the respective energy storage device. In this case, the energy storage device can be severely damaged or even destroyed. Moreover, as long as the state of charge of the energy storage device exceeds the upper state of charge limit SOC-H, the energy storage device is in a state where its operation lifespan is diminished by additional charging. It is also possible in a conventional system that the communication link connecting the communication interface of the energy resource controller with the control unit is interrupted or its bandwidth is limited so that no reaction at all takes place and the state of charge SOC of the energy storage devices can increase until the energy storage device is severely damaged. In a worst-case scenario where additional security measures are not taken, a battery mistreated in such a fashion could even start to overheat thus causing severe security problems in the surrounding of the energy storage device.

Accordingly, there is a need for a method and apparatus for providing a grid service to a power grid which overcomes the above-mentioned problems and which in particular increases the overall operation lifetime of energy storage devices used by said power system.

SUMMARY

The present invention provides according to a first aspect a power system for providing a grid service to a power grid.

According to the first aspect of the present invention a power system for providing a grid service to a power grid is provided, said power system comprising:
  at least one energy storage device,
  at least one power absorbing load,
  an energy resource controller adapted to monitor the state of charge of the at least one energy storage device and to control the power output and input of the at least one energy storage device and to control the power input of the at least one power absorbing load.

In a possible embodiment of the power system for providing a grid service to a power grid, the power system comprises
  an energy resource controller adapted to monitor a state of charge of at least one energy storage device,
  wherein said energy resource controller adjusts in a normal operation mode a power supplied by the energy storage device to said power grid or a power received by the energy storage device from said power grid in response to grid parameters or to remotely generated control signals to stabilize said power grid,
  wherein if the monitored state of charge of said energy storage device exceeds an upper state of charge limit the energy resource controller connects in a power absorption mode a power absorbing load which is either controllable regarding its power absorption or has a fixed power absorption to said power grid as long as the grid parameters or remotely generated control signals indicate that power is to be removed from said power grid.

The provision of the power absorbing load avoids an excessive loading of the energy storage device thus increasing its operation life time. Moreover, a destruction of the storage device resulting from overloading is prohibited.

In a possible embodiment of the power system according to the first aspect of the present invention, if the monitored state of charge of said energy storage device drops below a lower state of charge limit the energy resource controller is adapted to control in a recharging operation mode a recharging of said energy storage device until the lower state of charge limit is reached by said energy storage device.

The provision of the recharging operation mode has the advantage that an excessive discharging of the energy storage device is avoided thus increasing the operation life time of the energy storage device.

In a further possible embodiment of the power system according to the first aspect of the present invention, if a required rate of power to be removed from said power grid within a predetermined time period as indicated by said grid parameters or said remotely generated control signals exceeds a maximum admissible power input rate of said energy storage device the energy resource controller is adapted to control in a protective operation mode a charging of said energy storage device such that a rate of power input to said energy storage device either
  corresponds to the admissible maximum power input rate of said energy storage device by adjusting the rate of power absorbed by said controllable power absorbing load to balance the difference between the required rate of power and the admissible maximum power input rate of said energy storage device or
  is below the admissible maximum power input rate of said energy storage device by connecting the power absorbing load with a fixed power absorption to the power supply grid and reducing the power absorption of the energy storage device by the power absorption of the power absorbing load.

The provision of the protective operation load has the advantage that a too fast charging of the energy storage device is avoided thus increasing the operation life time of the energy storage device.

In a further possible embodiment of the power system according to the first aspect of the present invention, the power absorbing load comprises a thermal load.

The use of the thermal load allows to store also thermal energy.

In a further possible embodiment of the power system according to the first aspect of the present invention, the power absorbing load comprises an electrical load.

The use of an electrical load has the advantage that it is possible to store electrical energy which in turn can be transformed easily in other energy forms.

In a still further possible embodiment of the power system according to the first aspect of the present invention, the energy resource controller is connected to a local grid parameter measurement device to receive grid parameters of said power grid.

The use of a local grid parameter measurement device offers the advantage that there are no connection requirements to external devices.

In a further possible embodiment of the power system according to the first aspect of the present invention, the energy resource controller is connected to a communication device to receive grid parameters and/or control limits and/or control parameters via a communication link from a distributed or central control unit of said power grid.

This has the advantage that the coordination with other energy resource controllers of other users can be improved.

In a still further possible embodiment of the power system according to the first aspect of the present invention, the power absorbing load is controlled by said energy resource controller.

The direct control of the power absorbing load by a local energy resource controller has the advantages that no communication with an external unit, in particular with a remote control unit, is necessary.

In a still further possible embodiment of the power system according to the first aspect of the present invention, the power absorbing load is controlled by said control unit.

The control of the power absorbing load by the control unit has the advantage that the processing load of the energy resource controller is reduced.

In a further possible embodiment of the power system according to the first aspect of the present invention, a thermal storage device is attached via a thermal connection to the thermal load.

The use of the thermal storage device in the power system has the advantage that not only electrical power but also thermal power can be stored.

In a further possible embodiment of the power system according to the first aspect of the present invention, the thermal storage device comprises a stone, a bulk metal, a phase change material and/or a water bath.

The use of stone, metal or phase change material has the advantage that these materials comprise a high specific heat per volume so that much thermal energy can be stored.

The use of water as the thermal storage device has the advantage that it is easily available and the heated water can be supplied directly to another technical system, for instance to a heating system of a residential home.

In a still further possible embodiment of the power system according to the first aspect of the present invention, a thermal dissipation device is provided to adjust a heat dissipating rate of heat dissipating from said thermal storage device.

By using a thermal dissipation device the temperature surrounding the energy storage device can be either increased or diminished depending on the environment. By adjusting the temperature to a predetermined set temperature the operation life time of the energy storage device can be increased.

In a still further possible embodiment of the power system according to the first aspect of the present invention, the thermal dissipation device is a controllable thermal dissipation device controlled by said energy resource controller.

In a further possible embodiment of the power system according to the first aspect of the present invention, the controllable thermal dissipation device comprises a controllable fan.

In a still further possible embodiment of the power system according to the first aspect of the present invention, the electrical load comprises a heat pump device and/or a refrigeration device.

In a still further possible embodiment of the power system according to the first aspect of the present invention, the thermal load comprises an electrical resistor.

In a still further possible embodiment of the power system according to the first aspect of the present invention, the energy storage device comprises an electrical storage device adapted to store electrical power.

In a still further possible embodiment of the power system according to the first aspect of the present invention, the energy storage device is connected via an AC/DC converter to a grid connection of said power grid.

In a still further possible embodiment of the power system according to the first aspect of the present invention, the power absorbing load is connected via a first switch controlled by said energy resource controller to said grid connection of said power grid.

In a still further possible embodiment of the power system according to the first aspect of the present invention, the energy storage device is connected via a second switch controlled by said energy resource controller to a grid connection of the power grid.

In a further possible embodiment of the power system according to the first aspect of the present invention, the energy resource controller is connected to a battery management system monitoring operation parameters of said at least one energy storage device.

The invention further provides according to a second aspect a method for providing a grid service to a power grid.

According to a possible embodiment of the method for providing a grid service to a power grid according to the second aspect of the present invention, the method comprises the steps of:

monitoring a state of charge of at least one energy storage device connected to said power grid, and adjusting in a normal operation mode a power supplied by the energy storage device to said power grid or received by the energy storage device from the power grid in response to grid parameters or remotely generated control signals to stabilize said power grid and connecting in a power absorption mode at least one power absorbing load to said power grid if the monitored state of charge of the energy storage device exceeds an upper state of charge limit as long as the grid parameters or remotely generated control signals indicate that power is to be removed from said power grid.

In a possible embodiment of the method according to a second aspect of the present invention, if the monitored state of charge of said energy storage device drops below a lower state of charge limit the energy resource controller is adapted to control in a recharging operation mode a recharging of said energy storage device until the lower state of charge limit is reached by said energy storage device.

In a still further possible embodiment of the method according to the second aspect of the present invention, if a required rate of power to be removed from said power grid within a predetermined time period as indicated by said grid parameters or said remotely generated control signals exceeds a maximum admissible power input rate of said energy storage device the energy resource controller is adapted to control in a protective operation mode a charging of said energy storage device such that a rate of power input to the energy storage device either corresponds to the admissible maximum power input rate of the energy storage device by adjusting the rate of power absorbed by the power absorbing load to balance the difference between the required rate of power to be removed from said power grid and the admissible maximum power input rate of the energy storage device or is below the admissible maximum power input rate of the energy storage device by connecting the power absorbing load which has a fixed power absorption to the power supply grid and by reducing the power absorption of the energy storage device by the power absorption of the power absorbing load.

BRIEF DESCRIPTION OF THE DRAWINGS

In the following, possible embodiments of the apparatus and method according to different aspects of the present invention are described in more detail with reference to the enclosed figures.

DETAILED DESCRIPTION

Figure 1:
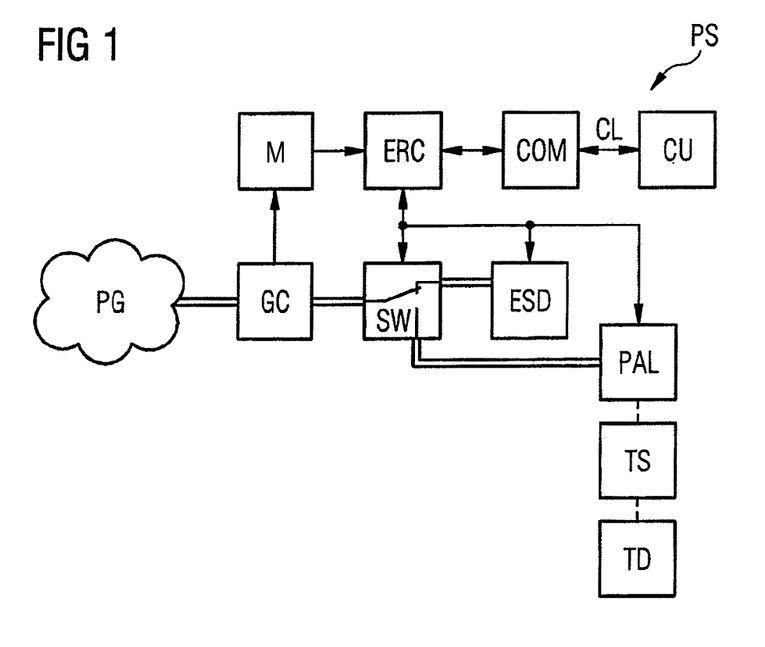
FIG. 1 shows a block diagram of a possible embodiment of a power system according to the first aspect of the present invention.

As can be seen in FIG. 1, a power system PS according to the first aspect of the present invention is used for providing a grid service to a power grid PG. The power grid PG is a power supply grid which provides power to consuming entities which can be provided for instance in residential homes. The power grid PG can comprise a transmission grid and a distribution grid to which local entities such as buildings or factories can be connected. The power system PS can comprise a central control unit or a distributed control units CU as illustrated in FIG. 1. As shown in FIG. 1, the power system PS comprises an energy storage device ESD. The energy storage device ESD can be an electrochemical energy storage device including at least one battery and/or accumulators. The energy storage device ESD is adapted to store electrical power. The energy storage device ESD is controlled by a local energy resource controller ERC as illustrated in FIG. 1. The energy resource controller ERC is adapted to monitor a state of charge of at least one energy storage device ESD within the respective facility. The energy resource controller ERC adjusts in a normal operation mode NM a power supplied by the energy storage device ESD to the power grid PG or a power received by the energy storage device ESD from the power grid PG in response to grid parameters or to control signals received from the control unit CU to stabilize the power grid PG. If the monitored state of charge SOC of the energy storage device ESD exceeds an upper state of charge limit SOC-H the energy resource controller ERC connects in a power absorption mode PAM a controllable power absorbing load PAL to the power grid as long as the grid parameters indicate that power is to be removed from the power grid PG. In the shown embodiment of FIG. 1, the energy storage device ESD is connected via a switch SW to a grid connection GC of the power grid. The switch SW is in the shown implementation controlled by the energy resource controller ERC and can in the shown embodiment connect either the energy storage device ESD or the power absorbing load PAL to the grid connection. The power absorbing load PAL can also be controlled by the energy resource controller ERC as shown in FIG. 1. The controllable power absorbing load PAL can be formed by a controllable thermal load and/or a controllable electrical load. The controllable power absorbing load PAL can be for instance formed by a resistor which transforms electrical energy into heat.

As shown in FIG. 1, a thermal storage device TS can be attached via a thermal connection or heat power connection to the power absorbing load PAL. This thermal storage device TS can comprise for instance a stone, a bulk metal, a phase change material or a water bath to store thermal energy.

In a possible embodiment, the water bath can be part of the heating installation of the home. For example, the power absorbing load can be a heat pump water heater or an electric water heater of resistive type. The water bath can then be implemented as the hot water storage of the home. This has the additional advantage that the energy which is converted to heat by the heat pump water heater or the electric water heater of resistive type can be used for heating the home or supplying hot water to the home.

In another possible embodiment, one or several thermal dissipation devices TD can be provided to adjust a heat dissipating rate of heat dissipating from said thermal storage device TS. This thermal dissipation device TD can in a possible embodiment be a heat sink. In a possible embodiment, the thermal dissipation device TD is a controllable thermal dissipation device, for instance implemented by installing a controllable fan to blow cooling air over the heat sink, which is controlled by the energy resource controller ERC.

In a possible embodiment, the controllable thermal dissipation device TD can be connected to a separate controller in the environment, e.g. in a residential home. This controller can use the heat stored in the thermal storage TS to control the temperature in the environment by measuring a temperature change in the environment and by increasing a thermal dissipation rate of the controllable thermal dissipation device TD if the temperature is too low and by decreasing the thermal dissipation rate of the controllable thermal dissipation device if the temperature is too high. In all other cases, the thermal dissipation rate of the controllable thermal dissipation device can be kept constant. In a possible embodiment, the controllable electrical load can comprise a heat pump device and/or a refrigeration device.

As can be seen in FIG. 1, the energy resource controller ERC is connected to a local grid parameter measurement device M which receives grid parameters of the power grid PG from the grid connection GC. Further, the energy resource controller ERC is connected to a communication device or interface COM to receive grid parameters and/or control limits and/or control parameters via a communication link CL from the distributed or central control unit CU of the power grid. The communication link CL as illustrated in FIG. 1 can comprise a wired or wireless link via a communication network. A wired link can for instance comprise a DSL connection. Further, the communication link CL can be a wireless communication link, for instance a UMTS link or a mobile telephone network. In a further possible implementation, the communication link CL can also be formed by a power line communication link. Accordingly, the energy resource controller ERC receives grid parameters from the local grid parameter measurement device M and/or from the control unit CU of the power grid PG. The energy resource controller ERC can be formed by a programmable logic device with one or several interfaces. The local grid parameter measurement device M can for instance be formed by a voltage meter or by a frequency meter connected to the grid connection GC of the power system. This grid connection GC is connected via the switch SW to the energy storage device ESD which can comprise one or several electrochemical storage devices to store electrical energy. The switch SW can in a possible implementation be a current switch such as a magnetic switch or a semiconductor switch. The energy storage device ESD can comprise a finite maximum state of charge $SoC_{max}$ such as the charging capacity of a battery or a maximum mechanical energy of a flywheel. In a possible embodiment, the power absorbing load PAL is sized such that its maximum power input matches or exceeds the maximum power input of the energy storage device ESD. Further, the thermal dissipation device TD can be sized so that the heat dissipated from the thermal storage TS matches the maximum power input of the power absorbing load PAL at a non-critical temperature of the thermal storage TS. In a possible embodiment, the energy resource controller ERC monitors the state of charge SOC of the energy storage device ESD as a percentage of the finite capacity. The energy resource controller ERC further receives data via the communication device COM as well as local grid parameters from the local grid parameter measurement device M.

Figure 4:
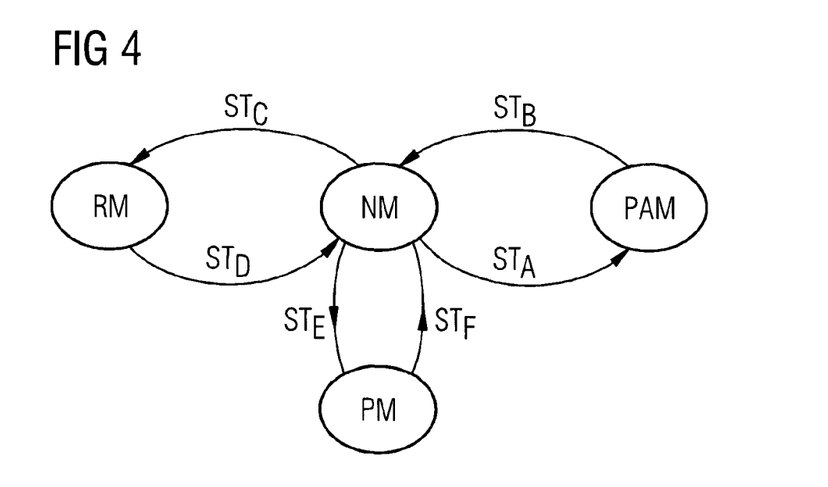
FIG. 4 shows a state diagram of system states in a power system according to the first aspect of the present invention.

The power system PS according to the first aspect of the present invention comprises multiple operation modes. FIG. 4 shows a state diagram of a possible implementation of operation modes used by the power system PS. The energy resource controller ERC adjusts in a normal operation mode NM a power supplied by the energy storage device ESD to the power grid PG or a power received by the energy storage device ESD from the power grid PG in response to grid parameters or remotely generated control signals to stabilize said power grid. In the normal operation mode NM, the energy resource controller ERC can set the power output by the energy storage device ESD and the power input into and stored by the energy storage device ESD according to the grid parameters measured by the local grid parameter measurement device M and/or by control signals received from the control unit CU via the communication device COM to stabilize the power grid. The control signals received from the control unit CU via the communication link CL can comprise global grid parameters and/or control limits and/or control parameters.

If the monitored state of charge SOC of the energy storage device ESD exceeds an upper state of charge limit SOC-H the energy resource controller ERC connects in a power absorption mode PAM the controllable power absorbing load PAL to the power grid PG as long as the grid parameters indicate that power is to be removed from said power grid PG. As shown in FIG. 4, the power system PS undergoes a state transition from the normal operation mode to the power absorption mode PAM via a state transition $ST_A$ if the grid parameters or control signals indicate that power is to be removed from said power grid PG and the monitored state of charge SOC of the energy storage device ESD exceeds an upper state of charge limit SOC-H. The upper state of charge limit SOC-H can depend on the type of the energy storage device ESD. The value of the upper state of charge limit SOC-H can be preconfigured in a local memory of the energy resource controller ERC. Further, it is possible that the upper state of charge limit SOC-H is transmitted by the control unit CU to the energy resource controller ERC and stored there as a configuration parameter. If the grid parameters or control signals indicate that no power has to be absorbed or if the state of charge SOC of the energy storage device ESD falls beneath the upper state of charge limit SOC-H, the power system PS undergoes a state transition $ST_B$ from the power absorption mode PAM back to the normal operation mode NM as illustrated in FIG. 4.

If the monitored state of charge SOC of the energy storage device ESD drops below a lower state of charge limit SOC-L the energy resource controller ERC is adapted to control in a recharging mode RM a recharging of said energy storage device ESD until the lower state of charge limit SOC-L is again reached by the energy storage device ESD. The provisioning of the energy required for the recharging is accomplished by the control unit CU either from other energy storage devices also controlled by said control unit CU or by power generators directly or indirectly controlled by said control unit CU. As illustrated in FIG. 4, there is a state transition $ST_C$ from the normal operation mode NM to the recharging operation mode RM if the state of charge SOC monitored by the energy resource controller ERC drops below the lower state of charge limit SOC-L. The lower state of charge limit SOC-L can be configurable. In the case of grid services which require a certain power output to be available for a certain timespan, the lower state of charge limit SOC-L has a lower critical value which can be calculated by dividing the product of this power output P and this timespan T by the maximum state of charge $SoC_{max}$ and the efficiency n of the energy storage device as follows: SOC-L=Pmax-s×Tmax-s/$SoC_{max}$×n. In the recharging mode RM, the energy resource controller ERC signals the need for recharging to the control unit CU. The energy resource controller can set the power input supplied to the energy storage device ESD or the power output supplied by the energy storage device ESD such that the power grid PG is stabilized and the energy storage device ESD is recharged. The energy resource controller accomplishes this by subtracting a constant recharging power from the power output supplied by the energy storage device for the application in which the power system is deployed e.g., grid balancing. The constant recharging power, the starting time and the end time of the recharging operation are signalled from the control unit CU via the communication device COM. The constant recharging power, the starting time and the end time of the recharging operation remain valid also in all other operation modes. If the state of charge SOC of the energy storage device ESD exceeds again the lower critical value SOC-L the energy resource controller can enter the normal operation NM in a state transition $ST_D$ as illustrated in FIG. 4.

In a possible embodiment, the power system PS comprises a further operation mode PM to protect the energy storage device ESD. If it is detected that a required rate of power to be removed from the power grid PG as indicated by the grid parameters or by remotely generated control signals exceeds a maximum admissible power input rate of the energy storage device ESD the energy resource controller ERC is adapted to enter a protective mode PM a as illustrated in FIG. 4. The protective operation mode PM of the energy resource controller ERC comprises the charging of the energy storage device ESD such that a rate of power input to the energy storage device ESD corresponds to an admissible maximum power input rate of the respective energy storage device ESD, which the energy resource controller accomplishes by adjusting the rate of power absorbed by the controllable power absorbing load PAL to balance the difference between the required rate of power and the admissible maximum power input rate of the energy storage device ESD. Accordingly, if the required rate of power to be removed from the power grid PG exceeds a maximum admissible power input rate of the energy storage device ESD the power system undergoes a state transition $ST_E$ from the normal operation mode NM to the protective operation mode PM as shown in FIG. 4. If the power rate falls under the maximum admissible power rate the protective operation mode PM is left in a state transition $ST_F$ and the energy resource controller ERC reenters the normal operation mode NM as shown in FIG. 4.

Figure 2:
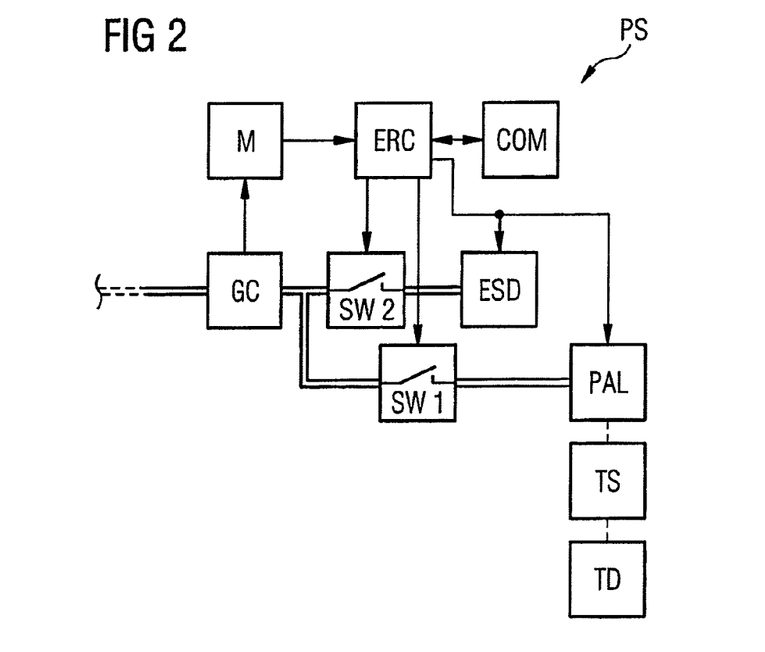
FIG. 2 shows a block diagram of a further possible embodiment of a power system according to the first aspect of the present invention.

FIG. 2 shows a possible embodiment of a power system PS according to the first aspect of the present invention. In the shown implementation of FIG. 2, the energy resource controller ERC controls two separate switches. In the shown embodiment, the power absorbing load PAL is connected via a first switch SW1 controlled by said energy resource controller ERC to the grid connection GC of the power grid PG. Further, the energy storage device ESD is connected via a second switch SW2 controlled by said energy resource controller ERC to the grid connection GC of the power grid PG. Both switches SW1, SW2 can be switched independently from each other. The first switch SW1 is provided to break a galvanic connection between the grid connection GC and the power absorbing load PAL, whereas the second switch SW2 can break the connection between the grid connection GC and the energy storage device ESD. In the normal operation mode NM, the energy resource controller ERC sets the first switch SW1 to a disconnected state and otherwise functions as in the implementation described in the context of FIG. 1. In a recharging mode RM, the energy resource controller ERC sets the first switch SW1 to a disconnected state and the switch SW2 to a connected state and otherwise works as in the implementation described in the context of FIG. 1. If the power to be removed from the power grid PG as signalled via the communication device COM or by the local grid parameter measurement device M exceeds a maximum rated power input of the energy storage device, the energy resource controller can enter the protective mode PM. In the protective mode PM, the energy resource controller ERC sets the first switch SW1 to the connected state and sets the power input of the energy storage device ESD to the maximum rated power input of the energy storage device ESD and further sets the power input of the power absorbing load PAL to the balance between the power to be removed from the power grid PG and the maximum power input of the energy storage device ESD. If the power to be removed from the power grid PG as signalled by the grid parameters does not exceed the maximum rated power input of the energy storage device ESD the energy resource controller ERC can enter the normal operation mode NM.

Further, in the case where the power absorbing load PAL is a power absorbing load with a fixed power absorption, the energy resource controller ERC can enter a protective mode PM when the power to be absorbed from the power supply grid PG as signalled by the control unit CU or by the grid measurement device M exceeds a maximum rated power input of the energy storage device ESD. In the protective mode PM, the energy resource controller ERC will set the switches SW1 and SW2 to a connected state and set the power input of the energy storage device ESD to the power to be absorbed from the grid minus the fixed power absorption of the power absorbing load PAL. When the state of charge SOC of the energy storage device ESD exceeds the upper charge limit SOC-H, the energy resource controller ERC will enter the power absorbing mode PAM. Otherwise, if the power to be absorbed from the power supply grid PG as signalled by the control unit CU or by the grid measurement device M does not exceed the maximum rated power input of the energy storage device ESD, the energy resource controller ERC enters the normal operation mode NM via a state transition $ST_F$.

In the power absorbing mode PAM, the energy resource controller ERC sets the switch SW1 to connected state and the switch SW2 to a disconnected state and otherwise functions as in the implementation described in the context of FIG. 1.

Figure 3:
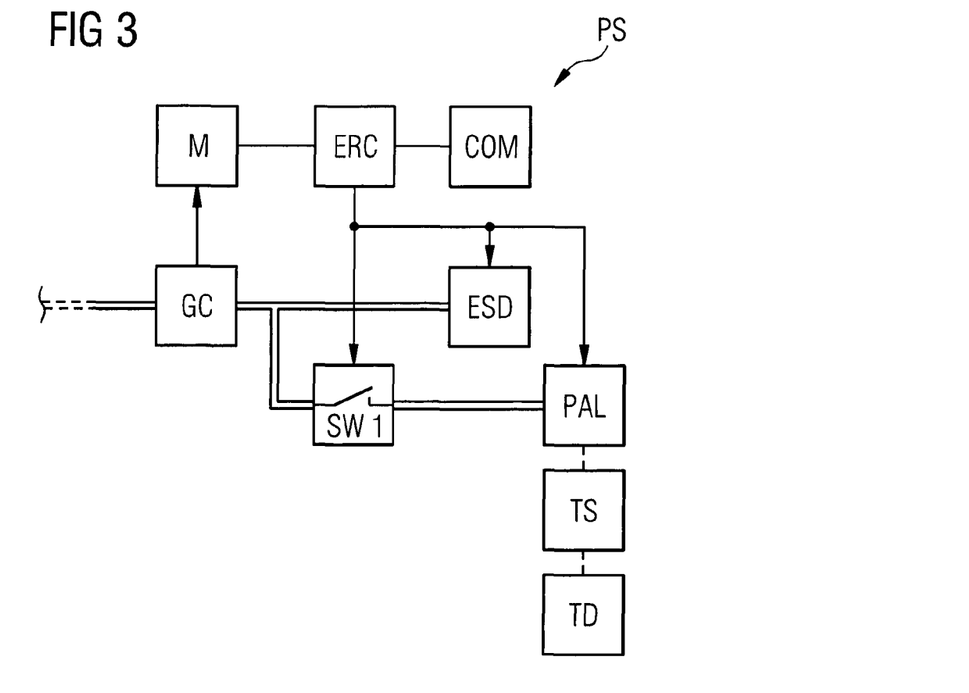
FIG. 3 shows a block diagram of a further possible embodiment of a power system according to the first aspect of the present invention.

FIG. 3 shows a further possible implementation of a power system according to the first aspect of the present invention. In the shown implementation, the energy resource controller does only control the first switch SW1. In the shown implementation, there is a permanent connection between the energy storage device ESD and the grid connection GC. The implementation of the shown embodiment is possible if the concept of the upper state of charge limit SOC-H is expanded to also include a value SOC-H'<SOC-H in addition to SOC-H.

Figure 5:
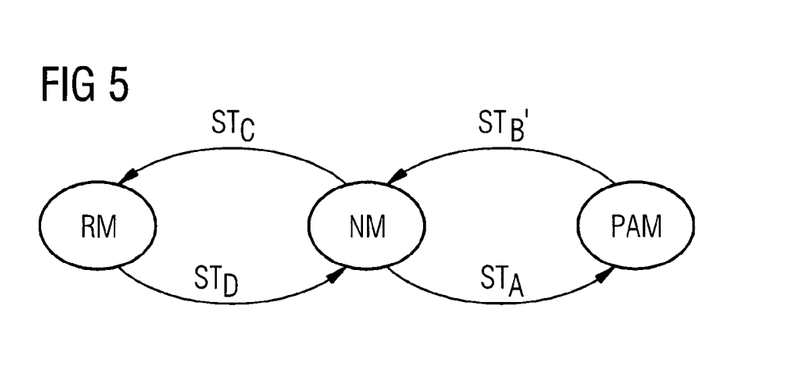
FIG. 5 shows a further state diagram for illustrating a possible embodiment of a power system according to the first aspect of the present invention.

FIG. 5 shows a possible state diagram employed in the power system of the embodiment shown in FIG. 3. In the state diagram of FIG. 5 the second state transition $ST_B'$ from the power absorbing operation mode PAM to the normal operation mode NM takes place if no power has to be absorbed from the power grid PG or the state of charge SOC of the energy storage device ESD is below the shifted reduced upper state of charge limit SOC-H'. Otherwise, the operation modes and state transitions are as described in the context of FIG. 2.

Figure 6:
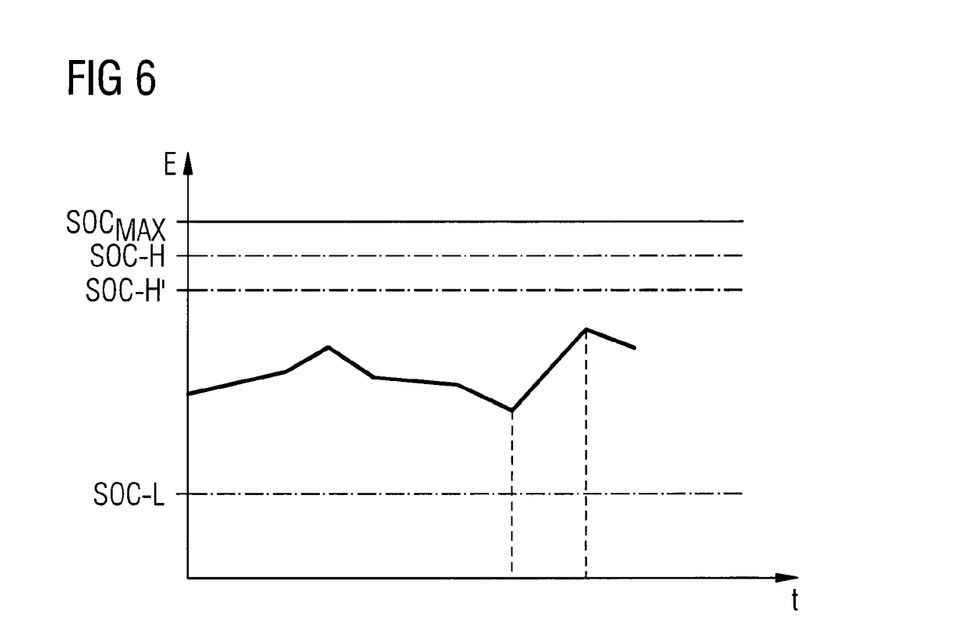
FIG. 6 shows a diagram for illustrating the operation of a method and apparatus according to the first and second aspect of the present invention.

FIG. 6 shows a diagram illustrating the operation of a power system according to the present invention. This storage device has a maximum state of charge $SOC_{max}$ as shown in FIG. 6. In the normal operation mode NM, the state of charge SOC of the energy storage device ESD is between the lower state of charge limit SOC-L and the upper state of charge limit SOC-H. In the implementation shown in FIG. 3, the concept of the upper state of charge limit SOC-H is expanded to an upper state of charge interval [SOC-H', SOC-H] as also shown in FIG. 6. The state of charge SOC shown in FIG. 6 can be monitored by the energy resource controller ERC. The energy resource controller ERC also monitors the slope of the state of charge SOC so that the maximum admissible power input rate of the energy storage device ESD is not exceeded. If the required rate of power to be removed from the power grid PG exceeds the maximum admissible power input rate of the energy storage device ESD the energy resource controller ERC enters the protective operation mode PM. If the monitored state of charge SOC of the energy storage device ESD exceeds the upper state of charge limit SOC-H the energy resource controller ERC connects in a power absorption mode PAM the power absorbing load PAL to the power grid PG as long as the grid parameters indicate that power is to be removed from the power grid PG. If the state of charge SOC of the energy storage device ESD drops below the lower state of charge limit SOC-L the energy resource controller ERC is adapted to control in the recharging operation mode RM a recharging of the energy storage device ESD until the lower state of charge limit SOC-L is again reached by the energy storage device ESD. Accordingly, the state of charge SOC of the used energy storage device ESD is almost always in a normal range between the lower state of charge limit SOC-L and the upper state of charge limit SOC-H or SOC-H' in the implementation as described in the context of FIG. 3. Since the energy storage device ESD does only briefly enter critical ranges its operation lifespan is increased significantly.

Figure 7:
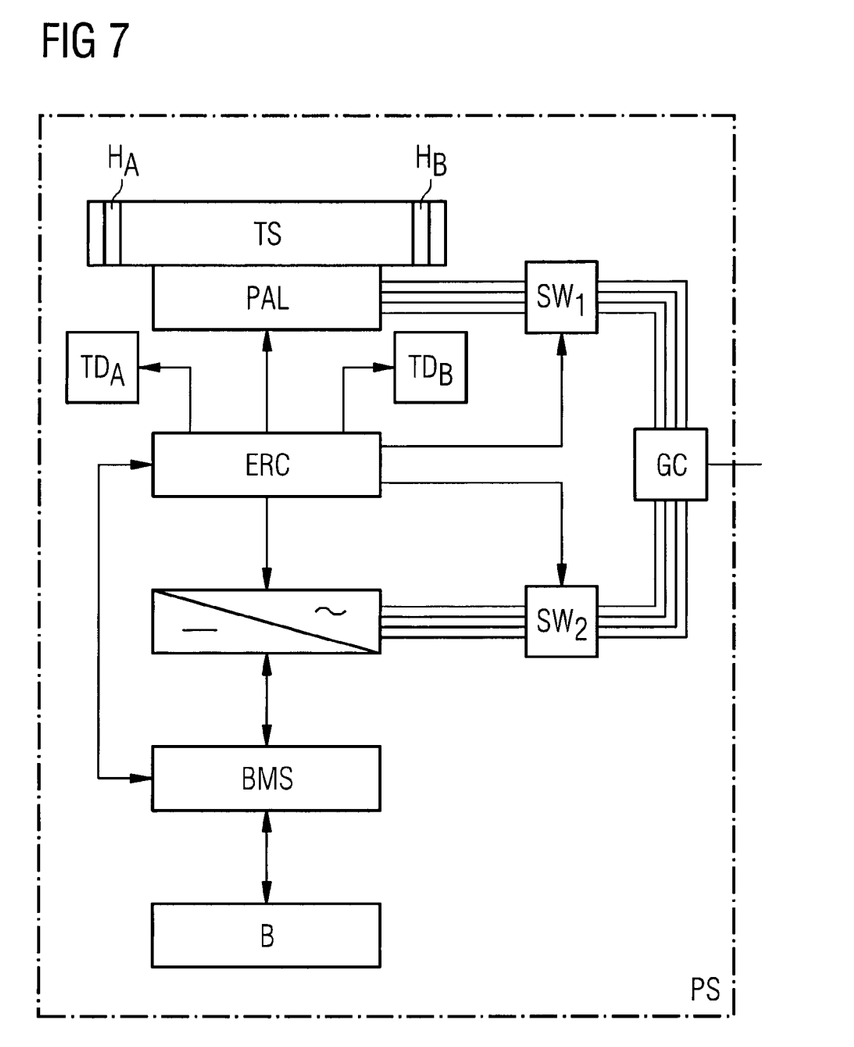
FIG. 7 shows a possible implementation of a power system according to the first aspect of the present invention.

FIG. 7 shows a possible implementation of a power system PS for providing a grid service to a power grid PG. In the shown implementation, the power system PS is a power system rack comprising one or several batteries B connected to a battery management system BMS. The battery management system BMS can, among other functions, monitor operation parameters of the energy storage devices ESD formed by the batteries B. In the shown implementation, the battery management system BMS connects the batteries B to an AC/DC converter or inverter which transforms DC voltage into AC voltage for the power grid PG. The battery management system BMS can monitor and supply operation parameters of the batteries or energy storage devices ESD to the energy resource controller ERC as illustrated in FIG. 7. The energy resource controller ERC can control at least one power absorbing load PAL which can be for instance formed by a resistor transforming electrical power received from the power grid PG via the grid connection GC or from the converter or inverter into heat. To the power absorbing load PAL a thermal storage device TS can be attached via a thermal connection as shown in FIG. 7. The thermal storage device TS can for instance be formed by a heat-storing stone. In the shown implementation of FIG. 7, there are multiple air-conducting channels through the thermal storage device TS illustrated as $H_A$ and $H_B$ in FIG. 7. These holes can connect the interior of the power system rack to the surrounding environment. The energy resource controller ERC is further adapted to control controllable thermal dissipation devices $TD_A$ and $TD_B$ provided in the vicinity of the channels $H_A$ and $H_B$. The energy resource controller ERC which can be formed by a programmable logic is further adapted to control first switches SW1 connecting power lines of the power grid PG to the power absorbing load PAL as well as second switches SW2 connecting power lines of the power grid PG to the AC/DC converter as shown in FIG. 7 in a physical implementation of the architecture shown in FIG. 3. The architecture from FIG. 2 can be physically implemented by replacing the switch SW2 with a permanent galvanic connection. The architecture from FIG. 1 can be implemented by also replacing the switch SW1 by permanent galvanic connections and by replacing the grid connection GC by a grid connection GC which can be switched from connecting the power absorbing load PAL to connecting the inverter or converter to the grid, a switch which can be effected by the energy resource controller via a control connection. In a possible embodiment of either physical implementation, the energy resource controller ERC can request to receive an operation parameter of the batteries B, for instance the temperature of the batteries B. If the temperature of the batteries B exceeds a preset threshold value the thermal dissipation devices $TD_A$ and $TD_B$ are activated to suck air from below so that air passes through the holes H to the environment. In this way, the batteries B beneath the thermal dissipation devices TD are cooled thus increasing their operation lifetime. Also, a part of the thermal energy emitted by the batteries B is stored in the thermal storage device TS. In contrast, if the temperature indicated by the operation parameters received by the energy resource controller ERC from the battery management system BMS indicates that the temperature of the batteries B is below a predetermined threshold value the thermal dissipation devices TD are controlled by the energy resource controller ERC such that they draw air from the environment through the holes H of the hot thermal storage device TS to increase the temperature of the air surrounding the batteries B. In this way, the temperature of the batteries is kept in a desired temperature range thus increasing the total operation lifetime of the batteries B.

Moreover, the energy resource controller ERC can perform additionally a method for providing a grid service to the power grid PG. The power system PS according to the first aspect of the present invention as illustrated in the embodiments of FIGS. 1, 2, 3 as well as in the embodiment of FIG. 7 is adapted to provide a grid service to the power grid PG. According to an aspect of the present invention, a method for providing a grid service to the power grid PG is provided. In a first step, a state of charge SOC of at least one energy storage device ESD connected to the power grid PG is monitored. In a further step, in a normal operation mode NM a power supplied by the energy storage device ESD to said power grid PG or a power received by the energy storage device ESD from the power grid is adjusted in response to grid parameters or remotely generated control signals to stabilize said power grid PG. Further, in a power absorption mode PAM a power absorbing load PAL is connected to the power grid PG if the monitored state of charge SOC of the energy storage device ESD exceeds an upper state of charge limit SOC-H as long as the grid parameters indicate that power is to be removed from the power grid PG.

The invention claimed is:

1. A power system for providing a grid service to a power grid, said power system comprising:
   at least one energy storage device,
   at least one power absorbing load,
   an energy resource controller adapted to monitor a state of charge of the at least one energy storage device and to control a power output and input of the at least one energy storage device and to control a power input of the at least one power absorbing load, wherein if a required rate of power to be removed from said power grid as indicated by grid parameters or remotely generated control signals exceed a maximum admissible power input rate of said energy storage device the energy resource controller is adapted to control in a protective operation mode a charging of said energy storage device and the power input of said power absorbing load such that the rate of power input to said energy storage device does not exceed the admissible maximum power input rate of said energy storage device.

2. The power system according to claim 1, wherein said energy resource controller adjusts in a normal operation mode a power supplied by the at least one energy storage device to said power grid or a power received by the at least one energy storage device from said power grid in response to grid parameters or remotely generated control signals,
   wherein if the monitored state of charge of said energy storage device exceeds an upper state of charge limit the energy resource controller connects in a power absorption mode a power absorbing load to said power grid as long as the grid parameters or remotely generated control signals indicate that power is to be removed from said power grid.

3. The power system according to claim 1 wherein if the monitored state of charge of said energy storage device drops below a lower state of charge limit the energy resource controller is adapted to control in a recharging operation mode a recharging of said energy storage device until the lower state of charge limit is reached by said energy storage device.

4. The power system according to claim 1 wherein said power absorbing load comprises a thermal load and/or an electrical load.

5. The power system according to claim 1 wherein said energy resource controller is connected to a local grid parameter measurement device to receive grid parameters of said power grid.

6. The power system according to claim 1 wherein said energy resource controller is connected to a communication device to receive grid parameters and/or control limits and/or control parameters via a communication link from a distributed or central control unit.

7. The power system according to claim 4 wherein a thermal storage device is attached via a thermal connection to said thermal load.

8. The power system according to claim 7 wherein said thermal storage device comprises a stone, a bulk metal, a phase change material and/or a water bath.

9. The power system according to claim 7 wherein said thermal storage device comprises a thermal buffer storage, this thermal buffer storage used to heat a home, building or provide hot water.

10. The power system according to claim 7 wherein a thermal dissipation device is provided to adjust a heat dissipating rate of heat dissipating from said thermal storage device.

11. The power system according to claim 9 wherein said thermal dissipation device is a controllable thermal dissipation device controlled by said energy resource controller.

12. The power system according to claim 11 wherein said thermal dissipation device comprises a fan.

13. The power system according to claim 4 wherein said electrical load comprises a heat pump device and/or a refrigeration device.

14. The power system according to claim 1 wherein said energy storage device comprises an electrical or electrochemical storage device adapted to store electrical power.

15. The power system according to claim 1 wherein said power absorbing load is connected via a first switch controlled by said energy resource controller to said grid connection of said power grid.

16. The power system according to claim 1 wherein said energy storage device is connected via a second switch controlled by said energy resource controller to a grid connection of said power grid.

17. A method for providing a grid service to a power grid comprising the steps of:
monitoring a state of charge of at least one energy storage device connected to said power grid,
adjusting in a normal operation mode a power supplied by the energy storage device to said power grid or received by the energy storage device from said power grid in response to grid parameters or remotely generated control signals to stabilize said power grid and
connecting in a power absorption mode a power absorbing load to said power grid if the monitored state of charge of the energy storage device exceeds an upper state of charge limit as long as the grid parameters or remotely generated control signals indicate that power is to be removed from said power grid, wherein if a required rate of power to be removed from said power grid as indicated by said grid parameters or remotely generated control signals exceed a maximum admissible power input rate of said energy storage device an energy resource controller is adapted to control in a protective operation mode a charging of said energy storage device and a power input of said power absorbing load such that the rate of power input to said energy storage device does not exceed the admissible maximum power input rate of said energy storage device.

18. The method according to claim 17 wherein if the monitored state of charge of said energy storage device drops below a lower state of charge limit the energy resource controller is adapted to control in a recharging operation mode a recharging of said energy storage device until the lower state of charge limit is reached by said energy storage device.

\* \* \* \* \*